Figure 1:
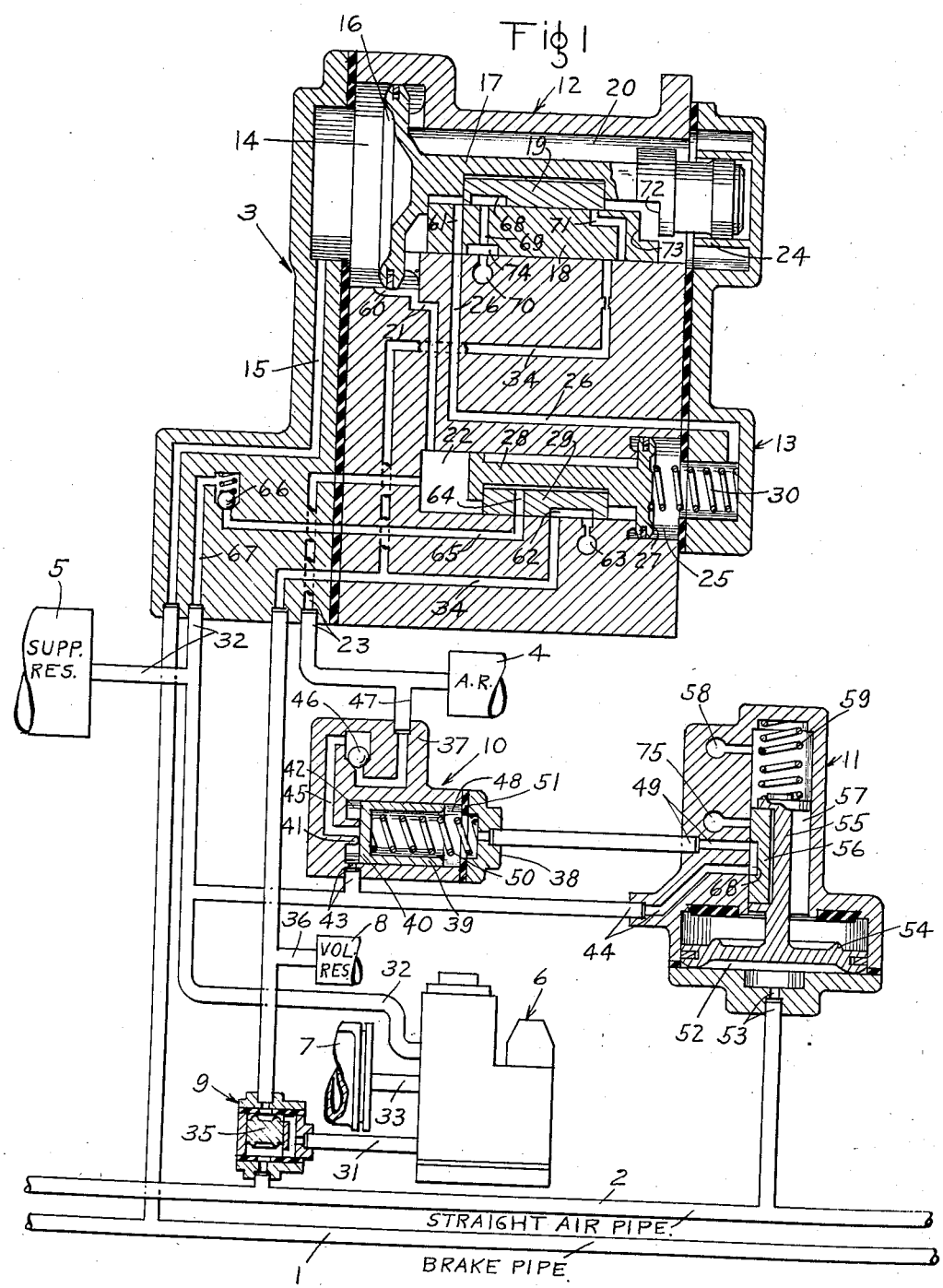

April 23, 1940.　　　D. L. McNEAL　　　2,198,038
FLUID PRESSURE BRAKE APPARATUS
Filed Jan. 31, 1939　　　2 Sheets-Sheet 2

INVENTOR
DONALD L. McNEAL
BY
ATTORNEY

Patented Apr. 23, 1940

2,198,038

UNITED STATES PATENT OFFICE 2,198,038

FLUID PRESSURE BRAKE APPARATUS

Donald L. McNeal, Wilkinsburg, Pa., assignor to The Westinghouse Air Brake Company, Wilmerding, Pa., a corporation of Pennsylvania Application January 31, 1939, Serial No. 253,761

17 Claims. (Cl. 303—26)

This invention relates to fluid pressure brake equipment for railway rolling stock and more particularly to that type of equipment shown in the prior application of Ellis E. Hewitt and Donald L. McNeal, Serial No. 160,562, filed August 24, 1937, which equipment is particularly adapted for use on trains operated in high speed service and which may be controlled by either automatic operation or by straight air operation.

As shown in the above mentioned application, it is proposed to employ a double check valve device for controlling, on the one hand, the supply and release of fluid under pressure by straight air operation, and, on the other hand, the supply and release of fluid under pressure by automatic operation for the purpose of effecting application and release of the brakes by either mode of operation. When a straight air application of the brakes is being effected, this check valve functions to isolate the automatic portion from the application and release pipe.

During such a straight air application of the brakes, there is a danger of leakage of fluid under pressure from the straight air supply passage past the seated end of the check valve to the automatic supply passage and hence to any chambers connected therewith. This automatic supply passage, and the connected chambers, are in some forms of the equipment normally connected to the atmosphere through the medium of valve means embodied in the equalizing portion of the automatic part of the equipment. Further, in some forms of the above mentioned type of brake equipments, but not in the equipment covered by the prior Hewitt and McNeal application, it has been discovered that when a straight air application of the brakes is being effected, the automatic portion of the equipment, due to unavoidable fluctuations in brake pipe pressure, develops a tendency to move or float from its normal release position to a release lap position. In this position the valve means embodied in the equalizing portion of the automatic part of the equipment operates to close the atmospheric communication leading to the automatic supply passage and any chambers connected therewith. With the atmospheric communication thus closed there can be no escape of fluid under pressure which may leak past the check valve into the automatic supply passage, so that the pressure of fluid in the passage and chambers in communication therewith will be increased according to the rate of leakage and duration of the straight air application of the brakes.

Now when, in releasing the straight air application of the brakes, the pressure of the straight air pipe has been reduced slightly below the pressure unintentionally built up and trapped in the automatic supply passage, the check valve will be caused to move from its straight air control position to a position where it cuts off the further release of fluid under pressure from the application and release passage, with the result that the brakes will be maintained applied with a brake cylinder pressure substantially equal to the pressure of fluid bottled up in the automatic supply passage.

Such undesired partial brake applications can only be released when the train is at a standstill by manual operation of the auxiliary reservoir release valve, which functions to reduce the pressure of the fluid in the auxiliary reservoir. When said pressure has been reduced the required degree below the pressure of the fluid in the brake pipe, the equalizing valve means of the automatic portion of the equipment will move from release lap position to its normal release position and establish communication between the atmosphere and the automatic supply passage, to thus exhaust the pressure bottled up in said passage and thereby permit a full release of the brakes. The time required to release the brakes in this manner on cars in a train would result in highly objectionable delay and thereby hinder the fast operating schedule called for in high speed service. Moreover, a consequence of a more serious nature is that the operator has no way of knowing that some of the brakes may be accidentally maintained applied, so that, if the train is in motion the brake shoes will drag on the wheels and cause unnecessary wear and heating of both shoes and wheels.

Even more serious damage is done when the retained brake application is such that the wheels are caused to slide on the track rails and thus cause flat spots to be worn on their treads. This is most likely to occur when the train is just put in motion after having been brought to a stop by a straight air application of the brakes.

The present invention contemplates a solution of this problem by providing a fluid pressure brake equipment of the above mentioned type with means whereby in effecting a straight air application of the brakes any fluid under pressure which may leak from the straight air pipe to the supply passage of the automatic portion of the equipment will be vented to the atmosphere, thus insuring a full and complete release of the brakes following every straight air application.

According to the invention, this object is attained through the medium of automatically operative means adapted to function during a straight air application of the brakes to maintain communication between the auxiliary reservoir and the supply reservoir, so as to maintain the equalizing piston of the automatic portion of the equipment in release position and thus insure maintaining the supply passage of the automatic portion of the equipment at atmospheric pressure.

Another object of the invention is to provide a fluid pressure brake equipment of the above mentioned type with a valve mechanism which normally maintains closed a communication from the auxiliary reservoir to the supply reservoir and which is operative to establish such communication only during straight air operation of the brakes. According to the object this communication between the auxiliary reservoir and the supply reservoir will be maintained closed when the brakes are released and when an automatic application of the brakes is being effected, but may be maintained open during a straight air application of the brakes.

Other objects and advantages of the invention will be more fully appreciated from the following description, which is illustrated by the accompanying drawings, wherein, Fig. 1 is a diagrammatic view mainly in section of a fluid pressure brake apparatus embodying one form of this invention.

Figure 2:
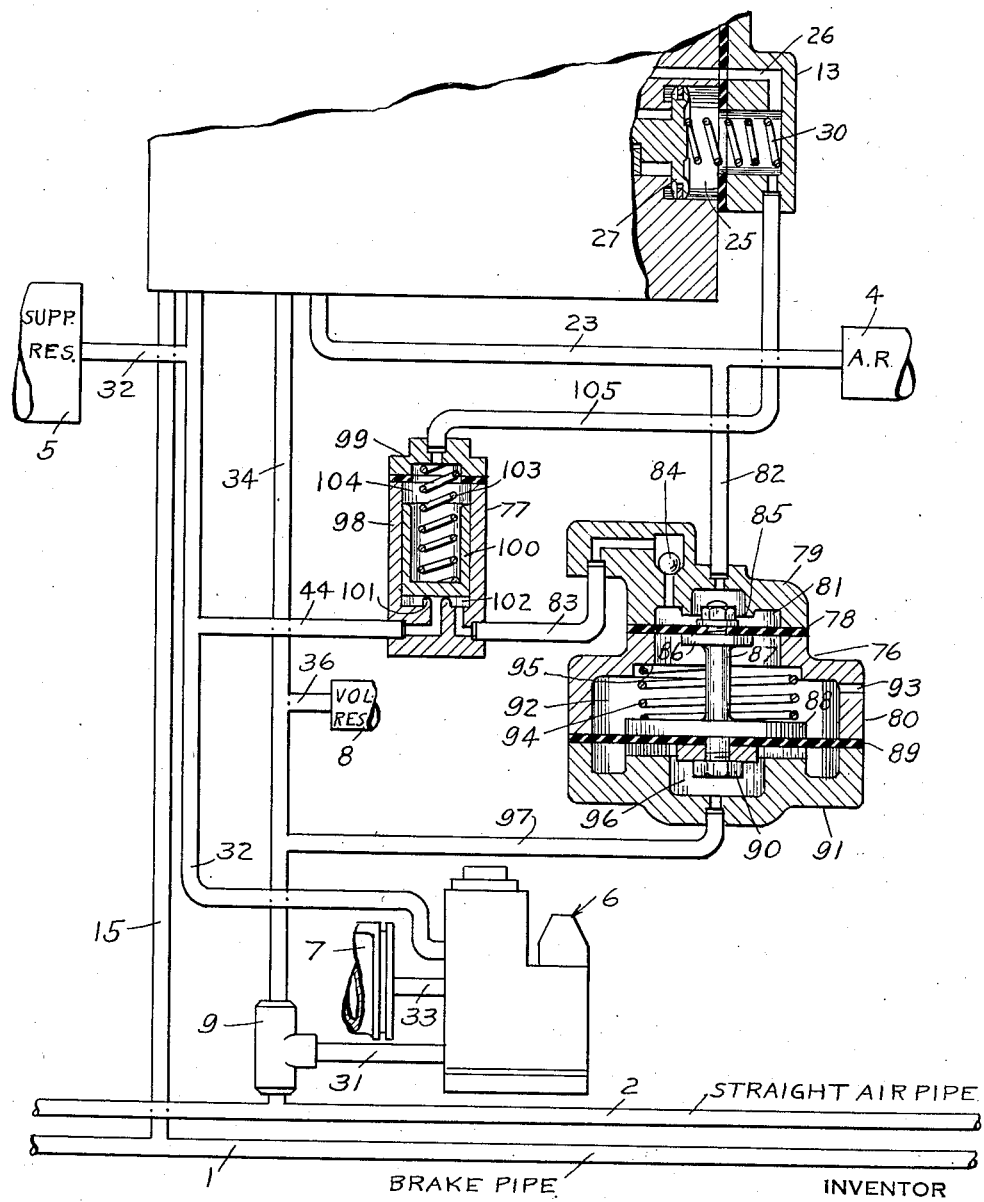

Fig. 2 is a diagrammatic view mainly in section of a fluid pressure brake apparatus embodying a modification of the invention.

As shown in Fig. 1 of the drawings, the equipment may comprise a brake pipe 1, a straight air pipe 2, a brake controlling valve device 3, an auxiliary reservoir 4, a supply reservoir 5, a relay valve device 6, a brake cylinder 7, a displacement volume chamber or reservoir 8, a double check valve device 9, a control vent valve device 10, and a straight air controlled pilot valve device 11.

The brake controlling valve device 3 may comprise an emergency portion and a pipe bracket portion which may be of substantially the same construction as the corresponding parts of the equipment shown in the prior application of Ellis E. Hewitt and Donald L. McNeal, Serial No. 160,562, filed August 24, 1937, and may also comprise an equalizing portion which may have many of the operating characteristics of the corresponding portions of the equipment shown in said application. The present invention relates particularly to the control of the equalizing portion and in view of this, and for the purpose of simplifying the showing and description of the invention, the emergency portion, the pipe bracket and certain details of the equalizing portion not essential to a clear understanding of the invention have been omitted.

As shown in Fig. 1 of the drawings, the equalizing portion of the brake controlling valve device 3 comprises an equalizing valve device 12, and a release relay valve device 13.

The equalizing valve device 12 may comprise a casing having a piston chamber 14 which is connected to the brake pipe 1 by way of a passage and pipe 15. The chamber 14 contains a piston 16 having a stem 17 adapted to operate a main slide valve 18 and an auxiliary slide valve 19, contained in a valve chamber 20, which is connected to the auxiliary reservoir 4 by way of passage 21, valve chamber 22 of the release relay valve device 13 and a passage and pipe 23.

The rear end portion of the piston stem 17 is preferably of cylindrical form and is slidably guided by an annular flange 24 carried by the casing. This portion of the stem is of substantially the same construction and has the same operating characteristics as the corresponding parts of the "AB" Equipment fully shown, described and claimed in the patent to Clyde C. Farmer, No. 2,031,213, issued February 18, 1936. In view of this and the fact that these details are not essential to a clear understanding of the invention, they have been omitted in the present instance to simplify the showing and description of the invention.

The release relay valve device 13 may comprise a casing which, in the present embodiment of the invention, is integral with the casing of the equalizing valve device 12. Provided in the casing is a piston chamber 25 which is connected to a passage 26 leading to the seat of the equalizing main slide valve 18 and which contains a piston 27 having a stem 28 adapted to operate a slide valve 29 contained in valve chamber 22. The chamber 22 is in constant open communication with the equalizing slide valve chamber 20 by way of passage 21, and in constant open communication with the auxiliary reservoir 4 by way of passage and pipe 23.

Also contained in the piston chamber 25 and interposed between and operatively engaging the piston 27 and casing is a spring 30 which normally maintains the piston and thereby the slide valve 29 in their proper release position, as shown in the drawings.

The relay valve device 6 is provided for the purpose of supplying fluid under pressure from the supply reservoir 5 to the brake cylinder 7 to effect an application of the brake and also for the purpose of venting fluid under pressure from the brake cylinder to effect a release of the brakes, and is adapted to be controlled either by the straight air portion of the equipment or by the automatic portion.

This relay valve device may be of substantially the same construction as the relay valve device disclosed and claimed in the patent to Ellis E. Hewitt, No. 2,096,491 issued October 19, 1937, and for this reason a detailed description of the device in the present application is deemed unnecessary. It should here be mentioned that with the several parts of the equipment in release position, the relay valve device connects the brake cylinder 7 to atmosphere, and that when in effecting an application of the brakes, fluid under pressure is supplied through pipe 31 to the piston chamber of the relay valve device. The device functions to first close the atmospheric communication from the brake cylinder and to then supply fluid under pressure from supply reservoir 5 and pipe 32 to the brake cylinder by way of a pipe 33. When, in effecting a release of the brakes, fluid under pressure is vented from pipe 31 and consequently from the relay piston chamber, the device functions to vent fluid under pressure from the pipe 33 and brake cylinder to the atmosphere.

The double check valve device 9 is for the purpose of conditioning the equipment for either straight air or automatic operation, and is automatically operative to its proper conditioning position when fluid under pressure is supplied thereto in initiating either a straight air or an automatic application of the brakes.

This device may be substantially the same in construction as the corresponding device shown and described in the aforementioned Hewitt and McNeal application and is here briefly described only as comprising a casing having a passage connected to the straight air pipe 2, a passage connected to the automatic application and release pipe 34 leading from the seat of the equalizing main slide valve 18, and a passage connected to the pipe 31 leading to the piston chamber of the relay valve device 6. Contained in the casing is a slidable check valve 35 which, when a straight air application of the brakes is initiated, moves to its upper seated position as shown, and thereby cuts off communication between the pipe 34 and the pipe 31, and establishes communication between the straight air pipe 2 and the pipe 31. When an automatic application of the brakes is being effected, the check valve assumes its lower seated position to establish communication between pipe 34 and the pipe 31 and closes the communication between the straight air pipe and the pipe 31.

The displacement reservoir 8 is provided for the purpose of adding volume to the piston chamber of the relay valve device 6 to control the operation of the relay valve device so as to provide the proper build-up of brake cylinder pressure in substantially the same manner as this control has been effected by the use of the well known dummy brake cylinder. This device may be of substantially the same construction as the corresponding device shown, described and claimed in an application of Ellis E. Hewitt, Serial No. 156,693, filed July 31, 1937, but for simplification has been shown as a reservoir connected through a pipe 36 to the pipe 34.

The control vent valve device 10, as will hereinafter more fully appear, is primarily for the purpose of venting fluid under pressure from the auxiliary reservoir, and connected valve chamber 20 of the brake controlling valve device to the supply reservoir when a straight air application of the brakes is being effected, so as to permit the auxiliary reservoir and valve chamber pressures to reduce with the reducing supply reservoir pressure. This prevents the maximum rate of reduction in brake pipe pressure to be expected in making a straight air application of the brakes from creating a sufficient fluid pressure differential on the brake controlling valve device to cause it to move from its normal release position, and is for the further purpose of maintaining the communication between the auxiliary reservoir and the supply reservoir closed at all other times.

In the present embodiment of the invention, the casing of this valve device 10 preferably comprises a body section 37 and a cap section 38 secured in any desired manner to the body section. Disposed in the body section is a piston valve 39 which is provided at one end with a valve portion 40 adapted to engage a seat rib 41 carried by the casing section 37. When the valve is seated on the rib 41 a chamber 42 is formed around the seat rib, which chamber is connected to the supply reservoir 5 by way of a passage and pipe 43, and pipes 44 and 32. The pipe 44 is also connected to the pilot valve device 11 for purposes which will hereinafter more fully appear. The seat rib 41 encircles a passage 45 which is connected through a pipe 47 to the auxiliary reservoir pipe 23, a ball check valve 46 being interposed in the passage and being adapted to prevent flow of fluid through the passage in a direction toward the pipe 47 and auxiliary reservoir 4.

At the other side of the piston valve 39 there is a chamber 48 which is connected to a pipe 49 leading to the pilot valve device 11 and which contains a spring 50 which at all times exerts pressure on the piston valve in the direction of the seat rib 41.

The pilot valve device 11 is provided for the purpose of controlling the operation of the control vent valve device 10 and as shown may comprise a casing having a piston chamber 52 which is connected through a passage and pipe 53 to the straight air pipe 2. The chamber 52 contains a piston 54 having a stem 55 adapted to operate a slide valve 56 contained in a valve chamber 57 which is connected to a passage 58 in constant communication with the atmosphere. Also contained in the valve chamber 57 and interposed between and operatively engaging the piston stem 55 and the casing is a spring 59 which normally maintains the piston stem and thereby the slide valve 56 and piston 54 in their release position, as shown in Fig. 1.

*Initial charging*

In initially charging the equipment the straight air pipe 2 will be connected with the atmosphere and fluid under pressure will be supplied in the usual manner to the brake pipe 1. Fluid under pressure thus supplied to the brake pipe 1 flows therefrom through pipe and passage 15 to the equalizing piston chamber 14, and from thence with the several parts of the brake controlling valve device in release position flows through a feed groove 60 to the slide valve chamber 20. From this chamber 20, fluid under pressure flows through passage 21 to valve chamber 22 of the relay release valve device 13. Fluid under pressure also flows from chamber 20 through a port 61 in the main slide valve 18 and passage 26 in registration with the port 26 to the relay piston chamber 25.

From this it will be seen that fluid pressures acting on opposite sides of the release piston 27 will be substantially equal to each other and that by reason of this the spring 30 will maintain the piston and thereby the release relay slide valve 29 in release position as shown. With the slide valve in this position the pipe and passage 34, pipe 36, and thereby the volume reservoir 8, are connected to the atmosphere by way of a cavity 62 in the slide valve 29 and a passage 63, the cavity connecting the passage 34 to the passage 63.

Since the pipe and passage 53 are connected to the straight air pipe 2, the piston chamber 52 of the straight air controlled pilot valve, will also be connected to the atmosphere, and by reason of this the spring 59 acts to maintain the piston 54 and thereby the slide valve 56 in release position, as shown.

If the check valve 35 of the double check valve device 9 should be in a position for straight air control, i. e., in its upper seated position, the piston chamber of the relay valve device 6 will be connected to the atmosphere by way of pipe 31 and the straight air pipe 2, but if it is in its lower seated position for automatic control, this piston chamber will be connected to the atmosphere by way of pipe 31, pipe and passage 34, cavity 62 in the release relay slide valve device 29 and passage 63. With the piston chamber of the relay valve device connected to the atmosphere through either of the two paths first traced, the relay valve device 6 establishes communication from the brake cylinder 7 to the atmosphere in the usual manner.

From the valve chamber 22 of the release relay valve device fluid under pressure flows through passage and pipe 23 to the auxiliary reservoir 4. Fluid under pressure also flows from pipe 23 to pipe 47, passage 45 and past a non-return ball check valve 46 to that portion of the face of the piston 40 exposed to the adjacent end of the passage 45 which is defined by the seat rib 41 of the piston valve 10.

Fluid under pressure also flows from the valve chamber 22 to the supply reservoir 5 by way of a port 64 in the release slide valve 29, a passage 65, past a non-return ball check valve 66, a passage 67 and pipe 32. Fluid under pressure flows from pipe 32 through pipe and passage 44 to the spring chamber 48 of the piston valve device 10 by way of pipe and passage 44, cavity 68 in the slide valve 56 of the pilot valve device 11, and passage and pipe 49.

Automatic service application of the brakes

An automatic service application of the brakes is initiated by effecting a gradual reduction in brake pipe pressure by the use of the brake valve mechanism hereinbefore mentioned. Since, as before described, the brake pipe 1 is in communication with the piston chamber 14 of the brake controlling valve device the pressure of fluid in this chamber gradually reduces with the brake pipe pressure.

Upon a predetermined, but light reduction in the pressure of fluid in the equalizing piston chamber 14, the pressure of fluid in the slide valve chamber 20 causes the piston 16 to move outwardly in a direction toward the left hand, and through the medium of the piston stem 17 shifts the auxiliary slide valve 19 relative to the main slide valve 18. The piston as it is thus being moved cuts off communication from the piston chamber to the slide valve chamber by way of the feed groove 60 so as to prevent back flow of fluid under pressure from the valve chamber to the piston chamber. As the piston and auxiliary slide valve are thus shifted relative to the main slide valve, a cavity 68 in the auxiliary slide valve connects the port 61 in the main slide valve to a port 69 also in the main slide valve. The port 61, with the several parts of the brake controlling valve device in release position, is in direct communication with the slide valve chamber 20, but when the auxiliary slide valve 19 is moved relative to the main slide valve 18 as just described, this communication is cut off and this port, and consequently the registering passage 26 and connected release relay piston chamber 25, are connected through cavity 68, port 69 and a passage 70 to the atmosphere. Fluid under pressure now flows from the piston chamber 25 to the atmosphere and as a consequence of the resulting reduction in the pressure of fluid in this chamber, fluid at auxiliary reservoir pressure in valve chamber 22 causes the piston 27 and thereby the slide valve 29 to move to application position, in which position the slide valve laps the passage 34, thus cutting off the release communication from this passage to the atmospheric passage 63.

It should here be mentioned that when an automatic application of the brakes is being effected, the several parts of the pilot valve device 11 and control vent valve device 10 remain in their normal position, as shown in Fig. 1 of the drawings, so that the communication between the auxiliary reservoir 4 and the supply reservoir 5 is maintained closed. The slide valve 29 in its application position cuts off the charging communication from the valve chamber 22 to the passage 65 leading to the supply reservoir 5 and to the chamber 48 of the valve device 10.

After the feed groove 60 is closed the continued movement of the piston 16 causes the rear end of the auxiliary slide valve 19 to uncover the service port 71 in the main slide valve to the slide valve chamber 20. At substantially the same time, the front face of a shoulder 72 engages the rear surface 73 of the main slide valve 18, so that upon the continued movement of the piston toward service position, the main slide valve will be shifted in the same direction.

As the main slide valve continues to move, the service port 71 is cracked open to the passage 34, so that fluid under pressure now starts to flow from the piston chamber 20 and connected auxiliary reservoir 4 and pipe 47 to the displacement or volume reservoir 8 and to the check valve device 9. Fluid under pressure thus supplied to the check valve device 9, causes the check valve 35 to move to the opposite position to that illustrated, if not already there, to permit fluid under pressure to flow from the pipe 34 to pipe 31 and thereby to the piston chamber of the relay valve device 6, the check valve 9 in this position closing communication between the straight air pipe 2 and the pipe 31. The movement of the check valve to this position will be prompt since, as will be understood, the straight air side of the valve is connected to the atmosphere by way of the straight air pipe 2.

Fluid under pressure thus supplied to the relay piston chamber causes the relay valve device to operate to close the exhaust communication from the brake cylinder to the atmosphere and to open the supply communication to permit fluid under pressure to flow from the supply reservoir 5 and the connected chambers 48 and 42 of the vent valve device 10 to the brake cylinder 7. Since the drop of supply reservoir pressure in chambers 48 and 42 is substantially equal, the spring 50 will maintain the piston valve 39 seated as illustrated in Fig. 1 of the drawings.

The piston 16 of the brake controlling valve device and slide valves 18 and 19 continue to move to service position in which the service port 71 is fully open to the passage 34, so that the relay valve device 6 will be caused to operate to provide the desired service rate of flow of fluid from the auxiliary reservoir 5 to the brake cylinder.

With the main slide valve in this position a tail cavity 74 of the port 69 maintains the passage 26 connected to the atmospheric passage 70 so that the piston chamber 25 of the release relay valve device is maintained vented to the atmosphere.

After the auxiliary reservoir pressure in chamber 20 has equalized with the brake pipe pressure in chamber 14 the piston 16 and attached slide valve 19 are moved to lap position in the usual way.

Automatic release of the service application of the brakes

To effect a release of the brakes following an automatic service application thereof; fluid under pressure is supplied to the brake pipe 1 and flows therefrom to the piston chamber 14 of the brake controlling valve device in the same manner as has before been described in connection with the initial charging of the equipment. This causes the several parts of the valve device to move to their release positions as shown in Fig. 1 of the drawings.

With the auxiliary slide valve 19 and main slide valve 18 of the brake controlling valve device in release position the port 61 in the main slide valve is in registration with passage 26 and is open to the slide valve chamber 20, so that fluid under pressure now flows from this chamber to the piston chamber 25 of the release relay valve device 13. Now when the pressure of fluid in this chamber becomes substantially equal to auxiliary reservoir pressure in chamber 22, the spring 30 acts to shift the release relay piston 27 and thereby the slide valve 29 to release position as shown. With the slide valve in this position, the cavity 62 connects passage 34 to the passage 63, so that fluid under pressure is vented from the displacement volume reservoir 8 and the piston chamber of the relay valve device 6. Further, with the slide valve 29 in this position, the port 64 registers with passage 65, so that fluid under pressure flows from the chamber 22 to the supply reservoir 5 and valve device 10 in the same manner as has before been described in connection with the initial charging of the equipment.

Upon the venting of the piston chamber of the relay valve device 6 as just described, the device is caused to function to vent fluid under pressure from the brake cylinder to the atmosphere, thus effecting the release of the brakes.

*Straight air application of the brakes*

When it is desired to effect a straight air application of the brakes, the operator, by the use of his brake controlling mechanism, causes fluid under pressure to be supplied to the straight air pipe 2, while maintaining the brake pipe 1 charged to the normal pressure carried.

From the straight air pipe 2 fluid under pressure flows to the double check valve device 9 and causes the check valve 35 thereof to assume its upper seated position as illustrated in Fig. 1 of the drawings. The check valve in this position cuts off communication between the pipes 34 and 31 and establishes communication between the straight air pipe 2 and the pipe 31, so that fluid under pressure flows from the straight air pipe to the piston chamber of the relay valve device 6 causing this valve device to function to supply fluid under pressure from the supply reservoir 5 to the brake cylinder 7 to effect an application of the brakes, the increase in brake cylinder pressure being commensurate with the increase in the relay piston chamber pressure.

Fluid under pressure also flows from the straight air pipe through pipe and passage 53 to the piston chamber 52 of the pilot valve device 11, causing the piston 54 and associated slide valve 56 to move inwardly from the position in which they are shown in Fig. 1, against the opposing action of the spring 59.

It should here be mentioned that the spring 59 is of such a value that it will yield quickly to the action of the piston 54 under influence of but a slight increase in straight air pipe pressure in piston chamber 52, so that the piston and slide valve 56 will assume their innermost position very soon after the initiation of the straight air application of the brakes.

With the several parts of the pilot valve device in application position as just described the passage 44 is blanked by the slide valve 56, thereby cutting off the flow of fluid under pressure from the supply reservoir 5 to the spring chamber 48 of the vent valve device 10. Further with the slide valve 56 in this position, the cavity 68 therein connects the passage 49 to passage 75 leading to the atmosphere.

With the chamber 48 of the valve device 10 thus vented to the atmosphere, the pressure of fluid in passage 45 and chamber 42 causes the piston valve 39 to move in the direction toward the right hand, as viewed in Fig. 1, against the opposing action of the spring 50, the right hand end of the piston valve sealing against a gasket 51 which is clamped between the casing sections 37 and 38 of the device.

With the valve portion 45 out of engagement with the seat rib 41, fluid under pressure now flows from the valve chamber 20 of the brake controlling valve device and connected auxiliary reservoir 4 to the supply reservoir 5 by way of pipes 23 and 47, passage 45, past the ball check valve 46, past the unseated valve portion 40, chamber 41, passage and pipe 43 and pipes 44 and 32. Since the pressure of the supply reservoir is reducing, due to the flow of fluid therefrom through the relay valve device 6 to the brake cylinder, the pressures of the chamber 20 and auxiliary reservoir will also reduce. The rate of this drop in reservoir and chamber pressures is intended to exceed the maximum rate of any accidental reductions in brake pipe pressure due to the erratic operation of the usual feed valve device during a straight air application of the brakes.

From the above description it will be understood that by thus reducing the pressure of fluid under pressure in valve chamber 20, the unintentional fluctuations in brake pipe pressure, above mentioned, will not result in the accidental movement of the several parts of the brake controlling valve device from their release position. By reason of this the several parts of relay release valve device 13 will remain in their normal release position in which the volume reservoir 8, pipe 36 and pipe and passage 34 are maintained connected to the atmosphere.

*Release of a straight air application of the brakes*

When it is desired to release a straight air application of the brakes, fluid under pressure is vented from the straight air pipe 2 and consequently from the piston chamber of the relay valve device 6 which causes the relay valve device to function to release fluid under pressure from the brake cylinder to the atmosphere. Since the chamber 52 of the pilot valve device 11 is connected to the straight air pipe 2 by way of passage and pipe 53 fluid under pressure in this chamber is also vented to the atmosphere and as a result of reduction in pressure in this chamber, the spring 59 acts to shift the pilot valve piston 54 and thereby the slide valve 56 to release position, as shown in Fig. 1 of the drawings. In this position the cavity 68 in the slide valve connects passage 49 to the passage 44 so that fluid under pressure in pipes 43 and 32 and the supply reservoir 5 is supplied to chamber 48 of the control vent valve device 10.

With the pressure of fluid in this chamber equal to the pressure in chamber 42 and the auxiliary reservoir pressure in passage 45, the spring 50 acts to shift the piston valve 39 into engagement with the seat rib 41 as shown in Fig. 1 of the drawings.

During the release of a straight air application of the brakes it is essential, in order to insure a complete release of the brakes, that the displacement volume reservoir 8, passage 36 and pipe and passage 34 be maintained connected to the atmosphere in order to prevent fluid under pressure which may leak past the check valve 35 of the double check valve device 9 from building up a pressure in these volumes. This atmospheric communication is normally established by the cavity 62 in the release relay slide valve 29 which connects the passages 34 and 63 together, and such connection is maintained so long as the pressure of fluid acting on opposite sides of the release relay piston remain substantially equal to each other. From this it is obvious that during a straight air application of the brakes and the subsequent release thereof this atmospheric communication will be maintained.

Now let it be assumed that when a straight air application of the brakes is being effected, the brake pipe pressure, due to erratic operation of the feed valve device, may be reduced sufficiently to cause the equalizing piston 16 and thereby the associated auxiliary slide valve 19 to unintentionally move outwardly relative to the main slide valve 18 from release position. When this occurs the cavity 68 in the auxiliary slide valve connects the port 61 and consequently the passage 26 and connected release relay piston chamber 25 to the port 69 which is open to the atmosphere through the cavity 74 and passage 70. With this communication established fluid under pressure is vented from the chamber 25 and as a result the release relay piston 27 and associated slide valve 29 are caused to assume application position, in which the slide valve laps the passage 34 thereby cutting off communication from this passage to the atmospheric passage 63.

It will here be noted that with the straight air controlled pilot valve 11 and the piston valve 19 operative this atmospheric communication will not remain closed, therefore any leakage of fluid past the check valve 35 cannot now build up a pressure in the passage 34 and volumes connected thereto for the reason that the pilot valve 11 operates to cause the piston valve 10 to establish communication from the auxiliary reservoir to the supply reservoir. Now, since the supply reservoir supplies the fluid under pressure for applying the brakes the pressure in this reservoir is reduced, therefore the pressure in the auxiliary reservoir, and in the connected chamber 20 of the equalizing valve device, is reduced and brake pipe pressure acting on the opposite side of the equalizing piston 16 in chamber 14 which is higher than this reduced pressure maintains the equalizing piston in release position, so that the release relay piston 27 and its associated slide valve 29 remain in release position. Therefore, the passage 34 will remain in communication with the atmosphere both during the straight air application and while the release of the brakes is taking place.

If it were not for the straight air controlled pilot valve device 11, and the piston valve device 10 preventing movement of the equalizing piston valve 16, leakage of fluid past the check valve 35 would, with the slide valve 29 of the release relay valve device in application position, build up pressure in the passage 34 which would act to prevent the complete release of a straight air application of the brakes as will be apparent from the following description.

When it is desired to release a straight air application of the brakes, fluid under pressure is vented from the straight air pipe 2 and consequently from the piston chamber of the relay valve device 6 which causes the relay valve device to function to release fluid under pressure from the brake cylinder to the atmosphere.

When, in effecting a straight air release of the brakes with leakage fluid trapped or bottled up in the displacement volume reservoir 8, pipe 36 and passage and pipe 34 (i. e., with the pilot valve 11 and piston valve 10 absent) and the straight air pipe pressure has been reduced slightly below the trapped or bottled up leakage fluid, the check valve 35 of the double check valve 9, under the influence of the pressure of the trapped leakage fluid, will be shifted from its straight air control position to its automatic control position, thus cutting off the further release flow of fluid from the piston chamber of the relay valve device 6 and establishing communication from the pipe 34 to this piston chamber. From this it will be seen that the brakes, instead of being entirely released as intended, will be maintained applied with a force commensurate with the pressure of the leakage fluid in the displacement reservoir 8, pipe 36 and pipe and passage 34.

The operator has no way of knowing that this undesirable condition exists when he again causes the train to be put in motion, with the result that the brake shoes and wheels will be unduly worn and excessively heated during the remainder of the run. But even more serious damage is done when the retained brake application is such as to cause the wheels to slide on the track rails, which sliding action causes flat spots to be worn on the wheels necessitating the replacement of the wheels.

According to the invention this undesirable action cannot occur for the reason that when a straight air application of the brakes is being effected, the straight air controlled pilot valve 11 and piston valve 10 function to open a communication between the auxiliary and supply reservoirs, thereby causing brake pipe pressure to maintain the equalizing piston valve of the service portion in its release position, which insures that the volume reservoir 8, the pipe 36 and pipe and passage 34 will be in direct communication with the atmosphere. Further, any leakage from the straight air pipe to the passage 34 cannot build up in the volume reservoir and prevent a full release of brake cylinder pressure when effecting a straight air release of the brakes since the passage 34 is in direct communication with the atmosphere.

*Embodiment shown in Fig. 2*

Only so much of the embodiment shown in Fig. 2 is illustrated as is necessary to point out the difference in construction and operation over the equipment shown in Fig. 1. The various pipes, passages and other parts of the equipment in the embodiment shown in Fig. 2 which correspond to those of the embodiment shown in Fig. 1 are correspondingly numbered.

Briefly, the embodiment shown in Fig. 2 differs from the embodiment shown in Fig. 1 in the provision of a different control for establishing communication between the auxiliary and supply reservoirs. A diaphragm valve 76 controlled by volume reservoir pressure is used in this embodiment instead of the pilot valve 11 controlled by straight air pipe pressure used in Fig. 1. In addition, a piston valve 77 controlled by the release relay piston port is used instead of the piston valve 10 under control of the pilot valve 11.

The diaphragm valve 76 comprises a casing containing a flexible diaphragm 78 clamped between a cap section 79 and a body section 80, thereby forming a chamber 81 which is connected by a passage and pipe 82 to the pipe 23 leading to the auxiliary reservoir 4. This chamber is also connected by a passage and pipe 83 past non-return check valve 84 to the piston valve 77.

The cap section 79 is provided with a seat ring 85 upon which the diaphragm 78 is adapted to seat and thereby cut off communication between the auxiliary reservoir and the piston valve 77.

Attached to the diaphragm 78 is a diaphragm follower 87 having a head portion 86 and at the opposite end a head portion 88, the head portion 88 being attached to a second diaphragm 89 by means of a washer and nut 90. The diaphragm 89 is secured in the casing between the body section 80 and a cap section 91.

The two diaphragms 78 and 89 form therebetween a chamber 92 directly connected to the atmosphere by way of restricted port 93. Also contained in the chamber 92 and operatively engaging the diaphragm follower head 88 and a shoulder 95 of the body casing 80 is a spring 94 which normally maintains the diaphragm 89 and thereby the diaphragm 78 in their release position, as shown in Fig. 2 of the accompanying drawings.

The diaphragm 89 forms with the casing section 91 another chamber 96, which is connected to the volume reservoir 8 and the automatic supply passage and pipe 34 by way of passage and pipe 97.

Considering now the piston valve 77 which, in the present embodiment of the invention, may comprise a body section 98 and a cap section 99. Disposed therein is a piston type valve 100, the valve piston being provided at one end with a seat adapted to seat on a rib 101. In the seated position, chamber 102, which is outside the rib 101 and connected by pipe 83 with the auxiliary reservoir by way of pipe 23, pipe and passage 82 and chamber 81, is cut off from the pipe 44 leading to the supply reservoir 5.

A coil spring 103, contained in the chamber 104 at the opposite side of the valve piston, urges said valve piston to its seat. This chamber is connected by way of passage and pipe 105 to the relay release piston chamber 25 of the equalizing piston valve device.

*Operation of embodiment shown in Fig. 2*

In the subsequent description of the operation of the embodiment shown in Fig. 2, no attempt will be made to describe specifically an application of the brakes by straight air or by automatic service, it being understood that such brake applications are effected in exactly the same manner as previously described in the case of the embodiment shown in Fig. 1.

For simplicity, therefore, only so much of the operation of the embodiment shown in Fig. 2 will be specifically described as is necessary to understand the difference over the embodiment of Fig. 1.

Assuming, therefore, that the equipment is initially charged with fluid under pressure, auxiliary reservoir pressure present in the relay release piston chamber 25 will flow by way of pipe and passage 105 to the piston chamber 104 of the piston valve 77. Fluid under pressure in the supply reservoir 5 will flow to the face of the piston valve 100 inside the seat rib 101 of the piston valve 77.

Since the pipe and passage 97 are connected to the pipe 34, the chamber 96 of the diaphragm valve 76 will be connected to the atmosphere, and by reason of this the spring 94 acts to maintain the diaphragm 89 and the associated diaphragm 78 in release position, as shown in the drawings.

From the auxiliary reservoir 4, fluid under pressure flows through pipes 23 and 82, and past seat rib 85 to chamber 81 of the diaphragm valve 76, from where it flows past non-return ball check valve 84 and through port and passage 83 to the chamber 102 of the piston valve 77.

Let it now be assumed that an automatic service brake application is initiated by effecting a gradual reduction in brake pipe pressure by the brake valve mechanism hereinbefore mentioned. Since, as before described, upon a predetermined but light reduction of fluid in the brake pipe the brake controlling valve device is caused to move to its service or brake applying position. In this position of the control valve device fluid under pressure is supplied from the auxiliary reservoir to the piston chamber of the relay valve device 6 by way of passage and pipe 34. Pressure in this pipe also flows to the volume reservoir 8 by way of pipe 36 from the pipe 34.

Now, in accordance with this embodiment of the invention, fluid under pressure in pipe 34 flows through pipe 97 to chamber 96 of the diaphragm valve 76 and when a predetermined pressure has been established in this chamber the diaphragm 89 is caused to flex against the opposing pressure of the spring 93. In so doing the diaphragm follower 87 and attached diaphragm 78 move to a position where the diaphragm 78 seats on the seat ring 85 thereby cutting off the flow of fluid under pressure from the auxiliary reservoir in pipe 82 to the passage 83 and the piston valve 77.

With the control valve in automatic service position the relay release piston chamber 25 is vented to the atmosphere, as hereinbefore described, so that the pipe 105 and the piston chamber 104 of piston valve 77 are also vented to the atmosphere.

Operation of the relay valve 6 causes fluid under pressure to be supplied from the supply reservoir 5 to the brake cylinder 7 by way of pipe 32, and since the pipe 44 is connected to pipe 32 the supply reservoir pressure acting on the face of the piston valve 100 inside the seat rib of the piston valve 77 is reduced. Therefore, during automatic service operation the valve 77 remains in the position illustrated, while the diaphragm controlled valve 76 functions to cut off communication from the auxiliary reservoir pressure to the pipe and passage 83.

Assuming that a release of the automatic brake application is made, the pressure in chamber 96 is vented to the atmosphere by reason of its connection to pipe 34 by way of pipe and passage 97. At the same time, auxiliary reservoir pressure is restored in the relay release chamber 25 and in piston chamber 104 of the piston valve 77. Therefore, when the diaphragm 78 of the diaphragm valve 76 is moved away from the seat ring 85 by action of the spring 94, communication between the pipes 82 and 83 is reestablished.

Let it be assumed that a straight air brake application has been effected by the brake controlling mechanism, causing fluid under pressure to be supplied to the straight air pipe 2, while maintaining the brake pipe charged to normal pressure value.

As before described, during a straight air brake application, in order to insure a complete subsequent release of the brakes, it is essential that the passage and pipe 34 and any connected chambers be connected to the atmosphere.

If it were not for the diaphragm valve 76, and the piston valve 77, leakage past the check valve 9 would act to prevent the complete release of a straight air application of the brakes, as hereinbefore described.

According to this embodiment of the invention, this undesirable action cannot occur for the reason that should fluctuations in brake pipe cause the equalizing piston and associated slide valve to move toward service position, the relay release piston chamber 25 and connected piston chamber 104 will be vented to the atmosphere which will permit the combined action of the pressure in chamber 102 and the pressure acting on the face of the piston valve 39 inside the seat rib 101 to overcome the opposing action of the spring 103 in the piston valve 77 and unseat valve 100. When this happens fluid under pressure flows from the auxiliary reservoir 4, by way of pipes 23 and 82 to the chamber 81 of the diaphragm valve 76, from whence it flows through passage and pipe 83 to the chamber 102 and into the passage and pipe 44 to the supply reservoir 5.

The reduction of fluid pressure in the auxiliary reservoir thereby permits the higher pressure in the brake pipe, which is being maintained charged to normal pressure value, to cause the equalizing piston valve and thereby the relay release piston 27 to assume their release positions.

Passage and pipe 34 are again connected to the atmosphere, so that any leakage that has accumulated in this passage and connected pipes and chamber will be vented to the atmosphere.

Should leakage occur past the check valve 9 into the pipe 34 and connected pipe 97, and chamber 96 of the diaphragm valve 76, during a straight air application of the brakes, it will be immediately released when the relay release piston 27 is moved to its release position, thus preventing trapped or bottled up leakage fluid from causing any undesirable brake applications when the straight air brake application is released.

While two embodiments of the improved brake controlling valve mechanism have been illustrated and described in detail it should be understood that the invention is not limited to these details of construction, and that numerous changes and modifications may be made without departing from the scope of the following claims.

Having now described my invention, what I claim as new and desire to secure by Letters Patent, is:

1. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, a valve device having a movable abutment operative upon a reduction of fluid pressure on one side thereof to establish communication between said auxiliary reservoir and said supply reservoir, and valve means for reducing the pressure on the said one side of said abutment during a straight air application of the brakes.

2. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, valve means for establishing communication between the auxiliary reservoir and supply reservoir, and a valve device subject to brake applying pressure for controlling said valve means when a straight air application of the brakes is effected.

3. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, and valve means for establishing a communication from the auxiliary reservoir to the supply reservoir when a straight air application of the brakes is being effected and for maintaining said communication closed when an automatic application of the brakes is being effected.

4. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, a valve device having a movable abutment operative upon a reduction of fluid pressure on one side thereof to establish communication between said auxiliary reservoir and said supply reservoir, and means responsive to the pressure of fluid in the straight air pipe in effecting a straight air application of the brakes for reducing the pressure on the said one side of said abutment.

5. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, and valve means operative in effecting a straight air application of the brakes to connect auxiliary reservoir and supply reservoir.

6. In a combined automatic and straight air fluid pressure brake equipment, in combination, an auxiliary reservoir from which fluid under pressure is normally supplied when effecting an automatic application of the brakes, a supply reservoir from which fluid under pressure is supplied when effecting a straight air application of the brakes, a valve device having a movable abutment operative upon a reduction of fluid pressure on one side thereof to establish communication between said auxiliary reservoir and said supply reservoir, and valve means having a movable abutment operative upon the initiation of a straight air application of the brakes to reduce the pressure on the said one side of the first mentioned abutment.

7. In a vehicle brake equipment in combination, a brake controlling valve device operative to effect an automatic application of the brakes, an auxiliary reservoir from which fluid under pressure is supplied by said brake controlling valve device when effecting an automatic application of the brakes, a supply reservoir from which fluid under pressure is supplied when effecting a straight air application of the brakes, and valve means operative in the event of accidental operation of the brake controlling valve device toward service position during a straight air operation of the brakes for establishing communication between said auxiliary reservoir and said supply reservoir.

8. In a vehicle brake equipment in combination, a brake controlling valve device operative to effect an automatic application of the brakes, an auxiliary reservoir from which fluid under pressure is supplied by said brake controlling valve device when effecting an automatic application of the brakes, a supply reservoir from which fluid under pressure is supplied when effecting a straight air application of the brakes, and valve means operative in the event of accidental operation of the brake controlling valve device toward service position during a straight air operation of the brakes for establishing communication between said auxiliary reservoir and said supply reservoir, and a valve device subject to brake applying pressure for controlling said valve means.

9. In a vehicle brake equipment in combination, a brake controlling valve device operative to effect an automatic application of the brakes, an auxiliary reservoir from which fluid under pressure is supplied by said brake controlling valve device when effecting an automatic application of the brakes, a supply reservoir from which fluid under pressure is supplied when effecting a straight air application of the brakes, and valve means having a movable abutment operative upon a reduction of fluid pressure on one side thereof to establish communication between said auxiliary reservoir and said supply reservoir upon accidental operation of the brake controlling valve device toward service position during a straight air application of the brakes.

10. In a vehicle brake equipment in combination, a brake controlling valve device operative to effect an automatic application of the brakes, an auxiliary reservoir from which fluid under pressure is supplied by said brake controlling valve device when effecting an automatic application of the brakes, a supply reservoir from which fluid under pressure is supplied when effecting a straight air application of the brakes, and valve means having a movable abutment operative upon a reduction of fluid pressure on one side thereof to establish communication between said auxiliary reservoir and said supply reservoir upon accidental operation of the brake controlling valve device toward service position during a straight air application of the brakes, and separate valve means subject to automatic brake applying pressure for controlling operation of the first mentioned valve means.

11. In a vehicle brake equipment in combination, a brake controlling valve device operative to effect an automatic application of the brakes, an auxiliary reservoir from which fluid under pressure is supplied by said brake controlling valve device when effecting an automatic application of the brakes, a supply reservoir from which fluid under pressure is supplied when effecting a straight air application of the brakes, and valve means operative in the event of accidental operation of the brake controlling valve device toward service position during a straight air operation of the brakes for establishing communication between said auxiliary reservoir and said supply reservoir, and a valve device having a movable abutment subject to brake applying pressure during an automatic application of the brakes for maintaining said communication closed.

12. In a combined automatic and straight air fluid pressure brake equipment, in combination, a brake controlling conduit through which fluid under pressure is supplied to effect an application of the brakes, a straight air pipe through which fluid under pressure is supplied to said conduit in effecting a straight air application of the brakes, a passage through which fluid under pressure is also supplied to said conduit to effect an automatic application of the brakes, an auxiliary reservoir from which fluid is supplied to said passage when effecting an automatic application of the brakes, a supply reservoir from which fluid is supplied to said pipe in effecting a straight air application of the brakes, a valve so constructed and arranged as to control communication between said conduit and each of said pipe and said passage as to cut off connection between said conduit and said passage when fluid under pressure is supplied to said pipe and to cut off the connection between said conduit and pipe when fluid under pressure is supplied to said passage, a valve device for establishing communication between the auxiliary reservoir and the supply reservoir when a straight air application of the brakes is being effected, and a second valve device responsive to the pressure in said passage for maintaining said communication closed when an automatic application of the brakes is being effected.

13. In a vehicle brake equipment in combination, an auxiliary reservoir from which fluid under pressure is normally supplied to a passage when effecting an automatic application of the brakes, a supply reservoir from which fluid under pressure is supplied to a pipe when effecting a straight air application of the brakes, valve means for isolating each communication from the other, release valve means normally connecting the first mentioned communication to the atmosphere and operative in effecting an automatic application of the brakes for closing the atmospheric connection from the communication, and valve means for establishing communication between the auxiliary reservoir and the supply reservoir when accidental operation of said release valve closes said atmospheric communication during a straight air application of the brakes.

14. In a combined automatic and straight air fluid pressure brake equipment of the type having a brake pipe and a control valve device subject to the opposing pressures of the brake pipe and a chamber and operative upon a reduction in brake pipe pressure for supplying fluid under pressure to effect an automatic application of the brakes, and also having a normally charged reservoir from which fluid under pressure is supplied in effecting a straight air application of the brakes, in combination, valve means operative upon a reduction in the pressure of fluid acting on one side thereof to connect the chamber of the control valve device to said reservoir, and means adapted to operate automatically when a straight air application of the brakes is being effected for reducing the pressure of fluid acting on said one side of said valve means.

15. In a combined automatic and straight air fluid pressure brake equipment of the type having a brake pipe and a control valve device subject to the opposing pressures of the brake pipe and a chamber and operative upon a reduction in brake pipe pressure for supplying fluid under pressure to effect an automatic application of the brakes, and also having a normally charged reservoir from which fluid under pressure is supplied in effecting a straight air application of the brakes, in combination, valve means operative upon a reduction in the pressure of fluid acting on one side thereof to connect the chamber of the control valve device to said reservoir, means adapted to operate automatically when a straight air application of the brakes is being effected for reducing the pressure of fluid acting on said one side of said valve means, and means for preventing back flow of fluid from said reservoir to the chamber of the control valve device when an automatic application of the brakes is being effected.

16. In a combined automatic and straight air fluid pressure brake equipment of the type having a brake pipe, an auxiliary reservoir and a control valve device subject to the opposing pressures of the brake pipe and the auxiliary reservoir and operative upon a reduction in brake pipe pressure for supplying fluid under pressure from the auxiliary reservoir to effect an automatic application of the brakes, and also having a normally charged supply reservoir from which fluid under pressure is supplied in effecting a straight air application of the brakes, in combination, valve means operative upon a reduction in the pressure of fluid acting on one side thereof to connect the auxiliary reservoir to said supply reservoir, and means adapted to operate automatically when a straight air application of the brakes is being effected for reducing the pressure of fluid acting on said one side of said valve means, and for preventing back flow of fluid from said supply reservoir to said auxiliary reservoir when an automatic application of the brakes is being effected.

17. In a combined automatic and straight air fluid pressure brake equipment of the type having a brake pipe, an auxiliary reservoir and a control valve device subject to the opposing pressures of the brake pipe and the auxiliary reservoir and operative upon a reduction in brake pipe pressure for supplying fluid under pressure from the auxiliary reservoir to effect an automatic application of the brakes, and also having a normally charged supply reservoir from which fluid under pressure is supplied in effecting a straight air application of the brakes, in combination, valve means operative upon a reduction in the pressure of fluid acting on one side thereof to connect the auxiliary reservoir to said supply reservoir, and means adapted to operate automatically when a straight air application of the brakes is being effected for reducing the pressure of fluid acting on said one side of said valve means.

DONALD L. McNEAL.